T. K. FISHEL.
AUTOMOBILE LOCKING DEVICE.
APPLICATION FILED JULY 27, 1918.
1,285,093.
Patented Nov. 19, 1918.
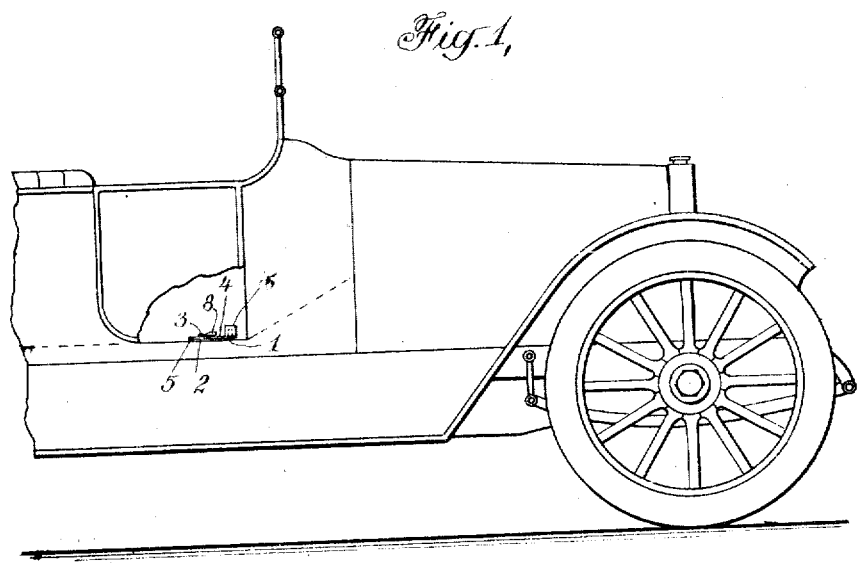
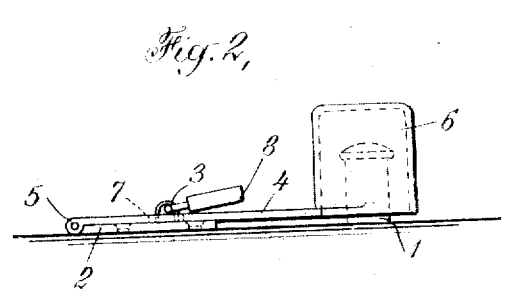
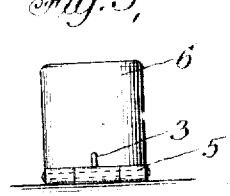
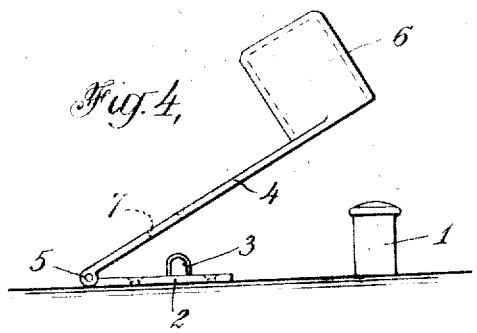
Inventor
Theodore K. Fishel
By his Attorney

UNITED STATES PATENT OFFICE.

THEODORE K. FISHEL, OF NEW YORK, N. Y.

AUTOMOBILE-LOCKING DEVICE.

1,285,093.  Specification of Letters Patent.  Patented Nov. 19, 1918.

Application filed July 27, 1918. Serial No. 247,014.

*To all whom it may concern:*

Be it known that I, THEODORE K. FISHEL, a citizen of the United States, residing in the city, county, and State of New York, have invented certain new and useful Improvements in Automobile-Locking Devices, of which the following is a specification.

My invention relates to a device for locking the starting lever of the so-called self-starting mechanism of an automobile.

The object of this invention is to provide a simple and inexpensive device for locking the starting lever of a self-starter so as to prevent tampering with or unauthorized use of the machine.

According to my invention I provide a device which can be readily applied to any automobile and which can be locked by means of an ordinary padlock or other suitable key-controlled lock.

My invention consists in the construction, combination and arrangement of parts hereinafter described and pointed out in the appended claim.

In the accompanying drawings illustrating my invention;

Figure 1, is a fragmentary side view of an automobile showing the locking-device applied to the starting lever of the self-starting mechanism.

Fig. 2, is a side elevation of the device in locking position.

Fig. 3, is an end elevation of the same, and,

Fig. 4, is a side elevation showing the device partly open.

Similar reference characters refer to similar parts throughout the several views.

Referring to the drawings, 1 indicates the starting lever of the self-starting mechanism. To start the automobile it is necessary to press down on this lever. The lever is arranged on the floor of the car and is operated by the foot of the driver. When the lever is pressed down it actuates the self-starting mechanism.

According to my invention I provide a hinged cap or cover which can be locked in position over said lever so as to prevent having access thereto except by an authorized person.

The locking-device consists of a plate 2 which is secured to the floor of the car by means of screws or other suitable fastening elements, said plate being provided with an upstanding staple 3. A hasp or bar 4 is hinged at one end, as at 5, to the plate 2 and carries at its opposite end a cap or cover 6 which is adapted to fit over the starting lever 1. The hasp or bar 4 is provided with a slot 7 through which the staple 3 projects in position for engagement by the bolt of a padlock 8.

By simply dropping the cap in position over the starting lever and applying the padlock, the lever may be locked so as to prevent unauthorized use of the car.

Various changes and modifications may be made in the form of the device herein illustrated and described without departing from the scope of my invention.

What I claim as my invention and desire to secure by Letters Patent is:

In an automobile locking-device the combination with the starting lever of the self-starting mechanism, of a plate fastened to the floor of the automobile, said plate being provided with an upstanding staple, a bar hinged at one end to the plate and carrying at its opposite end a cap adapted to fit over and cover the starting lever, said bar having a slot formed therein in registration with the staple, and a lock adapted to engage the staple to hold the bar against hinging movement.

THEODORE K. FISHEL.